United States Patent
Norris et al.

(10) Patent No.: US 10,194,243 B1
(45) Date of Patent: *Jan. 29, 2019

(54) DUMMY HEAD FOR ELECTRONIC CALLS

(71) Applicants: Glen A. Norris, Tokyo (JP); Philip Scott Lyren, Bangkok (TH)

(72) Inventors: Glen A. Norris, Tokyo (JP); Philip Scott Lyren, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,417

(22) Filed: Oct. 17, 2018

Related U.S. Application Data

(63) Continuation of application No. 16/010,519, filed on Jun. 18, 2018, now Pat. No. 10,111,004, which is a continuation of application No. 15/835,453, filed on Dec. 8, 2017, now Pat. No. 10,009,690.

(51) Int. Cl.
| | |
|---|---|
| H04R 5/00 | (2006.01) |
| H04R 5/027 | (2006.01) |
| H04S 7/00 | (2006.01) |
| H04W 4/80 | (2018.01) |
| F21Y 101/00 | (2016.01) |

(52) U.S. Cl.
CPC ............ *H04R 5/027* (2013.01); *H04S 7/304* (2013.01); *F21Y 2101/00* (2013.01); *H04S 2420/01* (2013.01); *H04W 4/80* (2018.02)

(58) Field of Classification Search
CPC ....................................................... H04R 5/00
See application file for complete search history.

(56) References Cited

U.S. PATENT DOCUMENTS

| | | | |
|---|---|---|---|
| 9,967,693 B1 * | 5/2018 | Seamans | H04S 7/306 |
| 9,980,075 B1 * | 5/2018 | Benattar | H04S 7/303 |
| 2014/0198918 A1 * | 7/2014 | Li | H04S 7/30 381/26 |
| 2015/0373477 A1 * | 12/2015 | Norris | H04M 1/72572 381/303 |
| 2016/0373877 A1 * | 12/2016 | Laitinen | H04S 7/304 |

* cited by examiner

Primary Examiner — Olisa Anwah

(57) ABSTRACT

A method captures binaural sound of a voice of a first user with microphones located at left and rights ears of a dummy head. The dummy head transmits the voice of the first user to a portable electronic device with or near the first user. This portable electronic device transmits the binaural sound over one or more networks to another electronic device being used by a second user to communicate with the first user during the electronic call.

20 Claims, 3 Drawing Sheets

DUMMY HEAD FOR ELECTRONIC CALLS

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
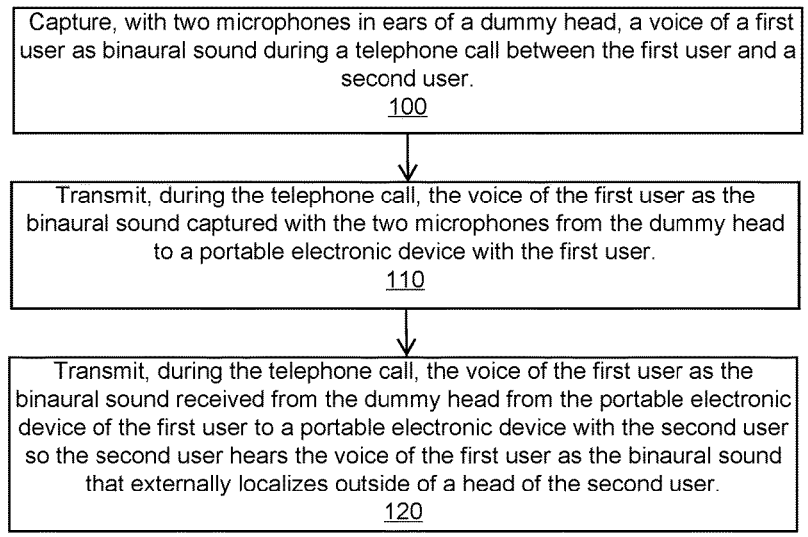
FIG. 1 is a method to capture and provide binaural sound with a dummy head during an electronic call between two users in accordance with an example embodiment.

One example embodiment is a dummy head that captures and transmits binaural sound to a portable electronic device during an electronic call.

One example embodiment captures as binaural sound a voice of a first user with microphones located at left and rights ears of a dummy head. The dummy head transmits the voice of the first user to a portable electronic device with or near the first user. This portable electronic device transmits the binaural sound over one or more networks to another electronic device being used by a second user to communicate with the first user during the electronic call.

Other example embodiments are discussed herein.

DETAILED DESCRIPTION

Example embodiments include methods and apparatus that capture and transmit binaural sound with a dummy head during an electronic call between two or more users.

Telecommunications face many problems and challenges in providing three-dimensional (3D) sound or binaural sound to users. These problems include capturing and/or generating binaural sound during a telecommunication and providing this sound to the users. Conventional solutions convolve sound with one or more head-related transfer functions (HRTFs) or other impulse responses. These conventional techniques are processor-intensive, time-consuming, and expensive to implement. Further, some of these conventional techniques do not generate binaural sound that users accurately localize to external locations. Example embodiments solve these problems and others.

Example embodiments provide fast and accurate binaural sound to users during telecommunications. Binaural sound is captured, transmitted, and provided to the users without requiring extensive processing resources expended by conventional techniques to convolve sound into binaural sound and to provide the sound to the users.

One example embodiment captures and provides binaural sound with a dummy head during an electronic call between two users. As the first user talks to the second user during the electronic call, microphones located in the ears of or at ear positions of or on opposite sides of the dummy head capture the voice of the first user as binaural sound. The dummy head then wirelessly transmits the voice back to a portable electronic device of the first user who is proximate to the dummy head. The portable electronic device (PED) transmits the voice received from the dummy head to a portable electronic device of the second user while the first and second users engage in the electronic call. The portable electronic device of the second user thus receives the voice of the first user as the binaural sound that was captured with the dummy head. Since the dummy head captures binaural sound, the second user hears the voice of the first user as sound that externally localizes away from second user. Extensive convolution or processing of the voice of the first user is not required, and the second user is also not required to have custom or stock HRTFs since the voice of the first user is captured as binaural sound with the dummy head.

FIG. 1 is a method to capture and provide binaural sound with a dummy head during an electronic call between two users in accordance with an example embodiment.

Block 100 states capture, with two microphones in ears of a dummy head, a voice of a first user as binaural sound during a telephone call between the first user and a second user.

One microphone is located inside, at, or near a left ear or ear area of the dummy head, and another microphone is located inside, at, or near a right ear or ear area of the dummy head. The microphones are separated from each other with the microphone in the left ear capturing sound for a left-channel, and the microphone in the right ear capturing sound for a right-channel. For example, the dummy head is a sphere or ovoid with a diameter of about six inches, such as a diameter of many human heads. The spherical dummy head can have ears that are the shape of human pinnae or a mound the size of a human pinnae. The microphones can be mounted at the surface of the sphere that has no ear or mound shape since in some cases effective binaural sound can be captured by microphones that are approximately six inches apart. Such microphones can capture sound with or without a head or dummy head or ovoid separating the left microphone from the right microphone.

The microphones are separated from each other with different distances. For example, a distance equals or approximates a width of a human head or distance between two ears of a human head. In this way, the two microphones record sound with an interaural time difference (ITD) that equals or approximates ITDs of a human head. For example, a distance about 22 centimeters (cm)-23 cm gives an ITD of about 660 microseconds (μm) when a sound source is 90° azimuth to the face of a listener (e.g., away from the listener and existing on a line that passes through the two ears of the listener).

In an example embodiment, the dummy head has a size and a shape that emulates, copies, or approximates a size and a shape of a human head. In this way, the two microphones capture head-related impulse responses (HRIRs) and/or binaural room impulse responses (BRIRs). The voice of the first user is thus not required to be convolved into binaural sound from stereo sound or mono sound that is conventionally captured with a portable electronic device (e.g., a smartphone). Instead, the dummy head captures sound (including the voice of the first user) as binaural sound.

The microphones capture a voice of the user while the users talk to each other during the telephone call. For example, when the first user is proximate to the dummy head or within a speaking range of the dummy head, the microphones capture the voice as binaural sound and transmit the voice to the PED with or near the first user. For instance, the user holds the portable electronic device or wears the portable electronic device. Alternatively, the portable electronic device is located near the user (e.g., located on a desk or table in a room or handbag with the person).

Example embodiments can also be implemented with dummy heads having other shapes, such as an object capturing ITDs, ILDs, and/or spectral cues for convolving sound into binaural sound for human hearing.

Block 110 states transmit, during the telephone call, the voice of the first user as the binaural sound captured with the two microphones from the dummy head to a portable electronic device with the first user.

While the first user is proximate to or within the speaking range of the dummy head, the dummy head captures sounds and sends them to the portable electronic device. These sounds (including the voice of the first user) are captured as binaural sound since the microphones are spaced apart on the dummy head.

The dummy head transmits the captured sound to the portable electronic device with one or more electronic devices, such as via a wireless transmitter or a wired connection between the dummy head and the portable electronic device. Further, the dummy head transmits the sound directly to the portable electronic device (e.g., using near-field communication (NFC), Bluetooth, a wired connection, or another wireless technology). Alternatively, the dummy head transmits the sound indirectly to the portable electronic device (e.g., transmitting the sound to the portable electronic device via a router, modem, server, or another electronic device).

Block 120 states transmit, during the telephone call, the voice of the first user as the binaural sound received from the dummy head from the portable electronic device of the first user to a portable electronic device with the second user so the second user hears the voice of the first user as the binaural sound that externally localizes outside of a head of the second user.

The first portable electronic device transmits the sound captured with the dummy head to the second portable electronic device via one or more of a wired or wireless network (e.g., a cellular network, the Internet, or another network). For example, the telephone call is one of a voice-over internet protocol (VoIP) call, a cellular call, or a landline call. Consider a call using a CODEC that supports two channels or a stereo call (e.g., OPUS, SIREN, or another HD Voice CODEC).

The second portable electronic device provides the voice of the first user to the second user as binaural sound that externally localizes outside of the head of the second user. For example, the second user hears the voice through electronic earphones, earbuds, headphones, electronic glasses, a head-mounted display (HMD), an optical head-mounted display (OHMD), speakers executing cross-talk cancellation, or other electronic device that provides binaural or 3D sound to a listener.

Figure 2:
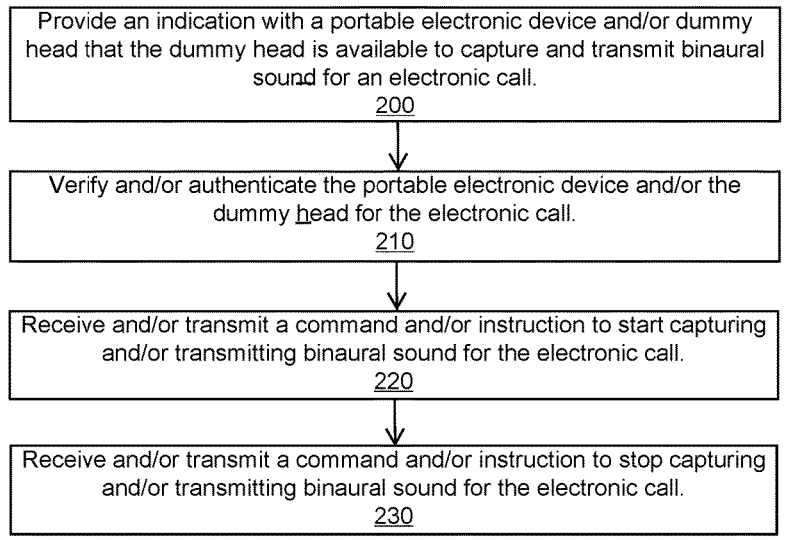
FIG. 2 is a method to start and stop capturing and/or transmitting binaural sound with a dummy head during an electronic call between two users in accordance with an example embodiment.

FIG. 2 is a method to start and stop capturing and/or transmitting binaural sound with a dummy head during an electronic call between two users in accordance with an example embodiment.

Block 200 states provide an indication with a portable electronic device and/or dummy head that the dummy head is available to capture and transmit binaural sound for an electronic call.

For example, the portable electronic device and/or the dummy head displays the indication as an icon, a symbol, words or text, a light, or other visible indicia. As another example, the portable electronic device and/or the dummy head provides sound to the user, and the sound indicates that the dummy head is available or activated or ready to capture and transmit binaural sound for the electronic call.

The indicating sound also indicates to the user that the dummy head is currently or actively capturing and/or transmitting sound during the electronic call. The indicating sound helps the user to determine when the dummy head is on and functioning to capture and transmit binaural sound during the electronic call.

For example, before, and/or during the electronic call, the portable electronic device displays a green light or a small icon or image of the dummy head. The light serves as a visual indication to the user that the dummy head is available for the electronic call and/or actively capturing and transmitting sound for the electronic call.

Block 210 states verify and/or authenticate the portable electronic device and/or the dummy head for the electronic call.

The portable electronic device and dummy head transmit signals to each other and exchange data to verify, authenticate, and/or track each other. Examples of the exchange include, but are not limited to, handshaking, passing keys or encryption/decryption data, transmitting unique identifications (including a password, a device network address, a device address or a device identifier, a username, etc.), and transmitting location or coordinate information.

For example, the data exchange step enables the portable electronic device and the dummy head to perform one or more of tracking a location of each other, identifying each other over a wireless network, encrypting and/or decrypting sound data being exchanged, determining a signal strength or availability for signal transmission, and determining packet loss or packet transmission quality.

Block 220 states receive and/or transmit a command and/or instruction to start capturing and/or transmitting binaural sound for the electronic call.

For example, the portable electronic device transmits a command to the dummy head that instructs the dummy head to activate, to power-on, to wake from sleep, to activate or turn on its microphones, to start capturing or monitoring binaural sound with its microphones, to start recording or storing or monitoring the sound being captured, and/or to start transmitting captured sound to the portable electronic device and/or another electronic device. As further examples, a user activates a physical or virtual switch or button that instructs or commands the dummy head to perform one or more these tasks.

Block 230 states receive and/or transmit a command and/or instruction to stop capturing and/or transmitting binaural sound for the electronic call.

For example, the portable electronic device transmits a command to the dummy head that instructs the dummy head to deactivate, to power-off, to sleep, to deactivate or turn off its microphones, to stop capturing binaural sound with its microphones, to stop recording or storing or monitoring the sound being captured, and/or to stop transmitting captured sound to the portable electronic device and/or another electronic device. As further examples, a user activates a physical or virtual switch or button that instructs or triggers or commands the dummy head to perform one or more these tasks.

Consider an example in which a user interacts with the portable electronic device to activate and/or deactivate microphones in the dummy head and/or portable electronic device. When the microphones in the dummy head activate to capture and transmit binaural sound during the telephone call, the microphone(s) in the portable electronic device mute, deactivate, turn off, silence, or stop. In this way, microphones in the dummy head provide the sound for the telephone call as opposed to the microphone(s) in the portable electronic device. This situation resolves a potential conflict wherein microphones at both the portable electronic device and the dummy head simultaneously capture and transmit sound for the telephone call.

When the sound is captured with the microphones in the dummy head during the telephone call, the second users hears the voice of the first user as binaural sound that externally localizes away from the second user. The voice externally localizes to a location (e.g., a point or area) known as a sound localization point (SLP). The SLP for the second user corresponds to a coordinate location that is based on a location of the first user with respect to the dummy head.

For example, if the first user is located at a spherical coordinate location of $(r, \theta, \phi)$ with respect to the facing direction of the dummy head (e.g., from the point of view of the dummy head), then the second user hears the voice of the first user at a SLP of $(r, \theta, \phi)$. For instance, if the first user is located at (2 m, 45°, 0°) relative to the face of the dummy head, then the second user will hear the voice of the first user at (2 m, 45°, 0°). In this example, the distance of the SLP away from the head of the second user is equal to a distance between a head of the first user and the dummy human head during the telephone call.

Consider an example in which a first and second user are engaged in a VoIP call. The first user is in a room that includes a dummy head. The dummy head captures the voice of the first user and transmits the voice back to a portable electronic device that is also in the room (e.g., a smartphone, HMD, OHMD, tablet computer, or another electronic device with or near the user). The portable electronic device performs the telephone call with a second portable electronic device with the second user. In this example, the dummy head functions as an apparatus for capturing the voice of the first user as binaural sound since the portable electronic device is not capable of or equipped for capturing such binaural sound. For example, a conventional smartphone is not capable of capturing binaural sound since it is not shaped as a dummy head that includes two microphones in its ears.

Consider an example in which two users communicate over a wireless network on an electronic call, and a dummy head at a location of the first user captures and transmits the voice of the first user back to a smartphone with the first user (or back to another PED with or proximate to the first user). The smartphone transmits a command to the dummy head to stop capturing the voice of the first user with the left and right microphones in the dummy human head. In response to receiving the command, the electronic device switches or changes the voice of the first user from being captured with the left and right microphones in the dummy human head to being captured with a microphone of the smartphone. While the microphone in the smartphone captures the voice of the first user, the microphones in the dummy head are muted, inactive, off, prevented from transmitting the captured sound back to the smartphone, or the sound from the dummy head is otherwise not transmitted to the second user.

Consider an example in which the PED and/or the dummy head displays, during the electronic call, an icon. This icon indicates that the voice of the first user is being captured with the left and right microphones in the dummy human head and not with a microphone of the first smartphone. The icon provides the first user with a visual indication as to which electronic device is capturing and/or sending the sound for the electronic call.

Consider an example in which the dummy head includes a light emitting diode (LED). The LED turns on or turns a certain color to indicate that the voice of the first user is being captured with the two microphones in the dummy human head and is being transmitted to the portable electronic device with the first user.

Consider an example in which the portable electronic device and/or dummy head receives an instruction to capture the voice of the first user with the two microphones in the dummy head. In response to receiving the instruction, a microphone in the PED with the first user mutes, deactivates, turns off, or disables, and the microphones in the dummy head are enabled to begin capturing sound. The result of the response is that the PED with the second user receives the voice of the first user that was captured by the two microphones in the dummy human head and not captured by the microphone in the PED with the first user.

Consider an example in which the PED with the first user receives an instruction or command from the first user to stop capturing the voice of the first user as the binaural sound with the dummy human head. The PED receives further instruction to start capturing and transmitting the voice of the first user as one of stereo sound or mono sound with a microphone located in the portable electronic device with the first user. For instance, the first user provides the command as a voice command, a gesture command, or a command from interaction with a display or other user interface of the portable electronic device.

Consider an example in which the portable electronic device and/or the dummy head detects a distance between the dummy human head and the portable electronic device with the first user or the first user. For example, the detection of the distance is performed with one or more of a proximity sensor, detection of wireless signal strength, triangulation of wireless signals, detection of a chip (e.g., radio frequency identification or RFID chip), or other method or apparatus. In response to detecting the distance, the PED and/or dummy head automatically switches the processing of the voice being transmitted to the second user. The result of the switch is that the voice of the first user is not transmitted as binaural sound and instead is transmitted as one of stereo or mono sound. For instance, the switch executes when the distance is less than one meter (e.g., switch when the first user talks during an electronic call while being less than one meter away from the dummy head).

Other example embodiments detect distance as well. Consider an example in which the portable electronic device and/or dummy head detects when the first user is no longer proximate to the dummy human head. For example, the first user is no longer proximate to the dummy head when one of the following occurs: the first user is farther than a predetermined distance (e.g., 2 meters, three meters, 4 meters, 5 meters, 6 meters, or 7 meters), the dummy head no longer detects or hears or captures the voice of the first user, a wireless signal strength drops or falls below a predetermined level, or the first user moves into another room. In response to detecting when the first user is no longer proximate to the dummy human head, the voice of the first user is switched or changed. The result of the switch is that the voice is changed from being transmitted as the binaural sound to being transmitted as one of stereo sound or mono sound.

Consider an example in which the dummy hand also serves as a stand or resting place for headphones of the user, and the dummy head includes one or more sensors (e.g., a sensor located in or near one of the ears or on the top of the head of the dummy). The sensor activates when the headphones are removed from or placed on the dummy human head. In response to sensing when the headphones are removed from the dummy human head, the dummy human head starts or enables capturing the voice of the first user for the telephone call. Also in response to the sensing, the voice of the first user captured with the left and right microphones of the dummy head starts or activates transmitting back to the smartphone of the first user.

Consider a similar example in which the headphones are returned to rest on the dummy head or placed such as to be worn by the dummy head (e.g., with the headphones covering an ear or ear area of the dummy head). The one or more sensors are triggered to cause an event (e.g., a telephone call is terminated or answered/established; the microphones at the dummy stop capturing sound; a microphone at a PED begins or resumes capturing sound; microphones included in the headphones begin capturing sound; a camera in the dummy head is activated or deactivated; or another event occurs).

Consider an example in which multiple users (e.g., more than two users) engage in a VR teleconference call while each user wears a HMD. The users meet in a VR chat room for a board meeting. Each user has a dummy head at his or her respective physical location. Each dummy head captures the voice of its respective user and transmits the voice in binaural sound back to the HMD worn by the user. The HMDs of each user then transmit their voice as binaural sound to each other user during the VR teleconference.

Figure 3:
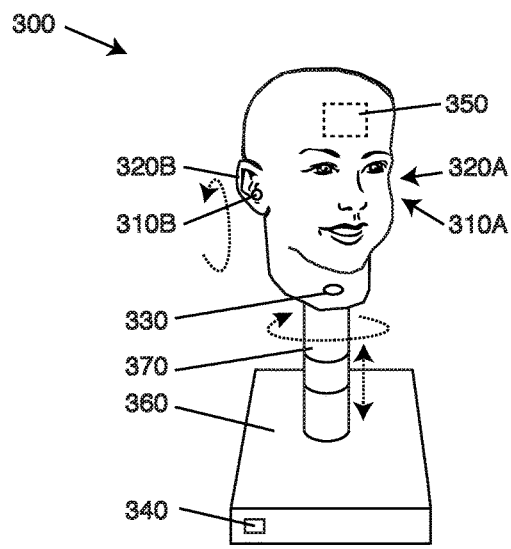
FIG. 3 is a dummy head with a left microphone located in a left ear and a right microphone located in a right ear in accordance with an example embodiment.

FIG. 3 is a dummy head 300 with a left microphone 310A located in a left ear 320A and a right microphone 310B located in a right ear 320B in accordance with an example embodiment.

In an example embodiment, the dummy head 300 includes a torso (not shown). The torso is a partial torso (such as stopping above the chest) or a full torso that extends below the chest. In another example embodiment, the dummy head has no torso (such as not having a torso below the neck as shown in FIG. 3). In another example embodiment, the dummy head is a part of a robot, such as a self-moving or automated robot (e.g., a robot shaped as a human). For illustration, the figures show a dummy head without a torso.

In an example embodiment, the dummy heads and torsos are made to copy, approximate, resemble, emulate, or represent a head and torso of a person. The head and torso can have generic or non-descript human features (such as eyes, ears, nose, hair, chin, etc.) or have specific human features to resemble an actual person (such as a dummy head that looks like a real or particular person) or have a general circular or oval shape (e.g., with a smooth surface with limited, nonspecific, or no facial features). A size and shape of the dummy head and torso can copy, approximate, resemble, emulate, or represent a size and shape of a head and torso of a human person, including a specific individual. In this manner, the dummy head can look like a specific human being or a generic human to capture binaural sound in the form of head-related impulse responses (HRIRs) and/or binaural room impulse responses (BRIRs).

In an example embodiment, the dummy head has a size, and acoustic reflectivity, of a human head and is made of one or more of silicone, rubber, pliable polymer, paper, moldable material, foam, wood, plastic, or another material.

Example embodiments include dummy heads that are inflatable, disposable, or reusable. For example, a 3D printed dummy head is printed as a hollow or empty head with a thin outer structure such that the printing process is relatively quick and inexpensive. After the printing microphones are installed or placed at the ears to capture binaural sound.

Consider an example in which a user provides or transmits to a friend a 3D image, one or more pictures or photos, or computer model of his head and/or face. With the image and model information, the 3D printer of the friend prints a 3D dummy head that copies or simulates the head of the user. The printed dummy head is positioned over a base or stand (or is self-standing), and left and right microphones are positioned in the ears of the dummy head. When the user places a telephone call to the friend, the friend speaks to the dummy head (printed in the likeness of the user) that, in turn, captures binaural sound in the room with the friend, such as the friend speaking and other sound sources having a higher frequency than speech. The captured sound is provided directly to the user with little or no convolving. As such, the user receives sound during the telephone call that is already captured per his/her head-related impulse responses since the dummy head causes similar impulse responses or copies or simulates the head of the user. Alternatively, the user transmits or provides his or her HRTFs or HRIRs to the friend to convolve the voice of the friend prior to transmission to the user.

Example embodiment dummy heads include a base 360 having a circular shape, square shape, or other shape. Example embodiment dummy heads and/or torsos are produced with a 3D printer from a 3D scan of a head or head and torso of the user, from a 3D model resulting from a scan, from photo or video images, or from other sources of information.

For example, base 360 includes a flat bottom that supports the dummy human head in an upright position. The base and/or head portion include one or more electronic components, such as those discussed in FIG. 4. An example embodiment includes a base that has a support 370 connecting the dummy head to the base 360. The support 370 is vertically adjustable or extendable as shown by the dashed vertical arrow beside the support 370. The purpose of adjustment is enable the height of the head to be set to an eye-level of the user or to another height relative to the head of the user as the dummy head base 360 rests on tables of different heights or on a floor. The adjustment of the height of the head is in the interest of the experience of the second user or remote party listening to the binaural sound captured with the dummy head. For example if the head of the dummy captures the voice of the user from a height that is too far below the eye-level of the user then the remote listener of binaural sound will experience the localization at an uncomfortable or unfamiliar elevation.

In an example embodiment, the support 370 allows the dummy head to swivel or rotate on more than one axis (shown by the two elliptical dashed arrows). The rotation about the axes allow the orientation of the head to change relative to the base 360. Changing the dummy head orientation causes the remote party listening to the localization of the sound or voice of the user to hear a change in the azimuth and/or elevation of the origin of the voice or sound captured by the dummy head.

As an example, the support 370 is collapsible and extendible to adjust the height of the head. For instance, the support 370 is formed of multiple telescopic sections that collapse and expand to change the height. As another example, the head includes a hollow portion that receives the support as the head moves toward and away from the base 360 to adjust the height of the head.

The left microphone 310A captures sound at the left ear 320A of the dummy head, and a right microphone 310B captures sound at the right ear 320B of the dummy head. These two microphones capture binaural sound and are positioned or built on, near, or inside the ears of the dummy head.

An example embodiment dummy head includes an additional reference microphone 330 that records and captures a mono signal. Sound is captured from the pair of microphones 310A and 310B, and simultaneously captured with the reference microphone 330. The reference microphone 330 is flush-mounted on the dummy head or extended away from the head. The reference microphone captures a room impulse response (RIR) of the environment for the captured binaural sound at the time of the binaural sound capture and at the location and orientation of the dummy head during the binaural capture. The captured RIR provides information to allow filtering the RIR from the captured binaural sound at a later time or in real-time in order to deliver a dry or more anechoic binaural sound. The reference microphone 330 is activated or deactivated dependently or independently of the microphones 310A and 310B.

In one example embodiment, the two microphones 310A, 310B communicate or electrically connect with a port or connector 340 via wireless communication or electrical wires. The port or connector 340 provides a location to communicate with the portable electronic device and/or provides a location for receiving power. For example, the port or connector serves one or more functions that include providing electrical power to the dummy head and providing audio input/output signals to/from the dummy head.

In one example embodiment, the dummy head includes electronics 350, such as one or more of a controller or processor, a memory, one or more lights (such as light emitting diodes, LEDs), a display, a user interface (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a wireless transmitter/receiver, et al. For example, the left and right microphones capture binaural sound, the reference microphone captures sound, and the electronics wirelessly transmit the sounds to an electronic device (such as a remote computer, smartphone, audio recorder, server, portable electronic device, etc.) and/or store the captured sound in the local memory in the dummy head such as flash memory.

Example embodiments include dummy heads wherein microphones 310A, 310B are either built-in or removable microphones at the ears of the dummy head. When the user removes the headphones from the dummy (for example, to wear on himself), a sensor is triggered that activates the microphones in the dummy head, and de-actives other microphones that may be active (e.g., a microphone in the portable electronic device).

Figure 4:
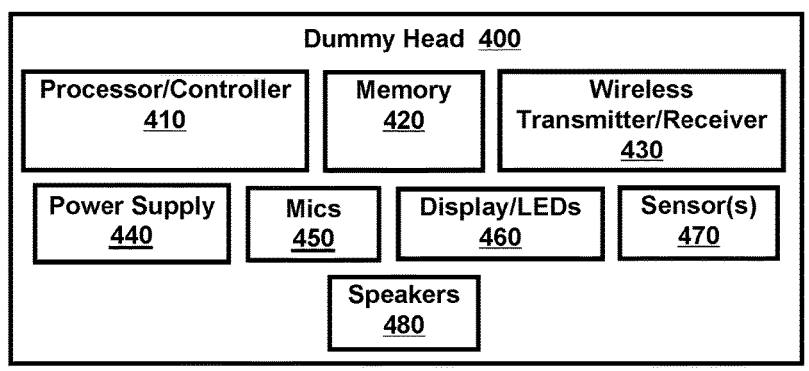
FIG. 4 is a dummy head with electronic components in accordance with an example embodiment.

FIG. 4 is a dummy head 400 with electronic components in accordance with an example embodiment.

The dummy head 400 includes one or more of a processor and/or controller 410, a memory 420, a wireless transmitter and/or wireless receiver 430, a power supply 440, microphones 450, a display and/or LEDs 460, one or more sensors 470, and speakers 480.

One or more of these electronic components are fabricated on one or more printed circuit boards located on or inside the dummy head. For example, the wireless transmitter/receiver is located on a printed circuit board with one being inside the left ear with a left-channel microphone and one being inside the right ear with a right-channel microphone.

For example, the processor 410 communicates with memory 420 that stores instructions and/or data to execute one or more example embodiments. The power supply 440 provides alternating current (AC) and/or direct current (DC). For example, the power supply includes one or more batteries. The microphones include a microphone in or at the left ear and another microphone in or at the right ear. The microphones can also include a reference microphone or other microphone. The sensors can include a proximity sensor, RFID sensor or tag, pressure sensor, light sensor, NFC chip, infrared sensor, or other type of sensor.

Figure 5:
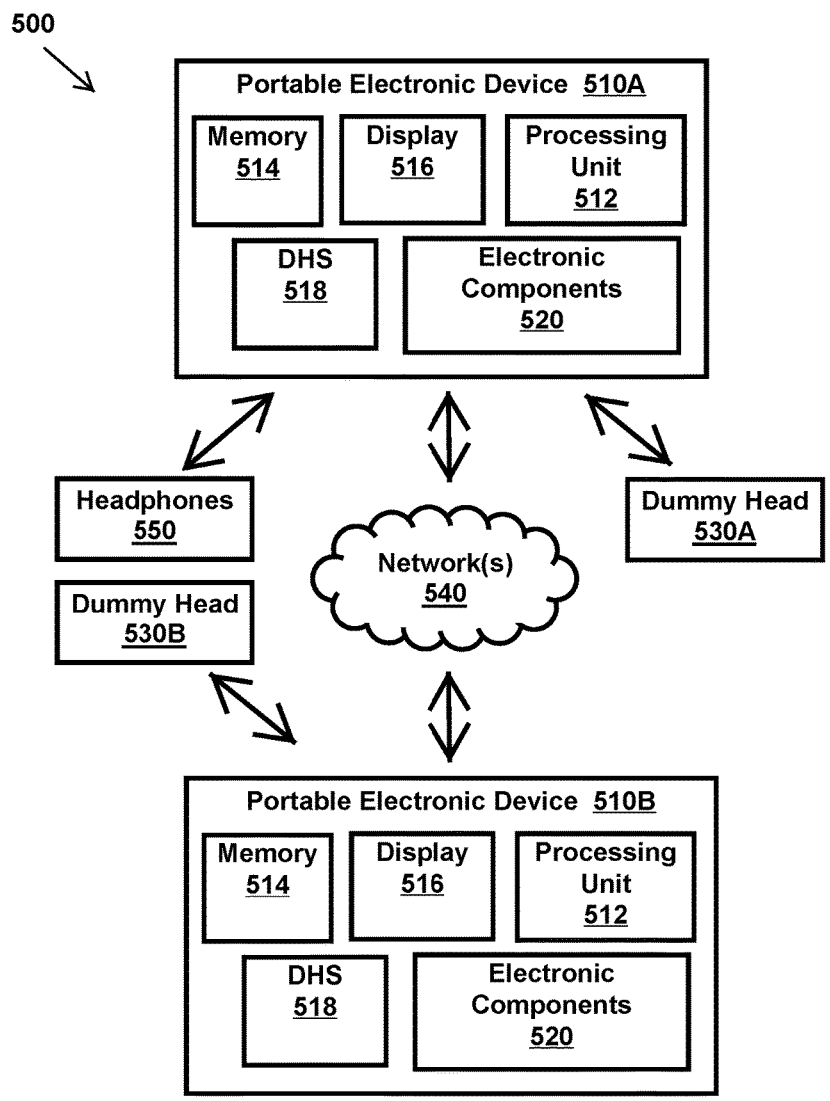
FIG. 5 is an electronic system in accordance with an example embodiment.

FIG. 5 is an electronic system 500 in accordance with an example embodiment.

The electronic system 500 includes portable electronic devices (PEDs) 510A and 510B, and dummy heads 530A and 530B that communicate over one or more networks 540.

The portable electronic device 510A and 510B include a processor or processing unit 512, memory 514, display 516, dummy head software or DHS 518 (such as software to execute one or more example embodiments discussed herein), and other electronic components 520 (such as one or more of a microphone, transmitter/receiver, sensor, speakers, audio storage memory, power, etc.). Two PEDs and two dummy heads are shown, but example embodiments include electronic systems or computer systems with many more, such as hundreds, thousands, or millions of PEDs and dummy heads.

The PEDs include but are not limited to headphones, earphones, or earbuds (shown as electronic components 520). Alternatively or additionally, the PEDs provide binaural sound to the user via separate headphones, earphones, or earbuds 550. For instance, headphones or earbuds 550 wirelessly communicate with the PED 510A to provide binaural sound to the user during the electronic call.

A portable electronic device includes, but is not limited to, handheld portable electronic devices (HPEDs), wearable electronic glasses, watches, wearable electronic devices (WEDs) or wearables, smart earphones or hearables, voice control devices (VCD), portable computing devices, portable electronic devices with cellular or mobile phone capabilities or subscriber identification module (SIM) cards, digital cameras, portable computers (such as tablet computers, desktop computers, and notebook computers), smartphones, appliances (including home appliances), head mounted displays (HMDs), optical head mounted displays (OHMDs), personal digital assistants (PDAs), headphones, and other portable electronic devices.

The network 540 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

The processor or processing unit 512 includes a processor (such as a central processing unit, CPU, digital signal processor (DSP), microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing units and/or digital signal processor (DSP) communicate with each other and memory and perform operations and tasks that implement one or more blocks of the flow diagram discussed herein. The memory, for example, stores applications, data, programs, algorithms (including software to implement or assist in implementing example embodiments) and other data.

The processor or processing unit 512 can include a digital signal processor (DSP). For example, a processor or DSP executes a convolving process with HRIRs retrieved from memory (or other transfer functions or impulse responses) to process sound so that the sound is adjusted, placed, or localized for a listener. Such convolution occurs when, for example, the dummy head does not capture binaural sound. Additionally, binaural sound captured with the dummy head is further processed and/or convolved.

For example, the DSP converts mono or stereo sound to binaural sound so the binaural sound externally localizes to the user. For example, the DSP receives binaural sound, moves the localization point of the binaural sound, adds or removes impulse responses (such as RIRs), and perform other functions.

For example, an electronic device or software program convolves and/or processes the sound captured at the microphones of the dummy head. The electronic device then provides the convolved sound to the listener so that the listener hears and localizes the sound. The listener experiences a resulting localization externally (such as at a sound localization point (SLP) associated with near-field HRTFs and far-field HRTFs) or internally (such as monaural sound or stereo sound).

Sounds are provided to the listener through speakers, such as headphones, earphones, stereo speakers, etc. The sound is also transmitted, stored, further processed, and provided to another user, electronic device or to a software program or process (such as an intelligent user agent, bot, intelligent personal assistant, or another software program).

As used herein, a "dummy human head" replicates, emulates, or approximates a human head and includes human facial features, such as one or more of ears and/or pinnae, a nose, eyes, and a mouth.

As used herein, an "electronic call" or a "telephone call" are connections over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, the word "proximate" means near. For example, a user proximate to a dummy head is located within a talking range of the dummy head, such as being located within 10 meters or less of the dummy head.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones at its ears).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method, comprising:
providing, during a telephone call between a first user with a first portable electronic device (PED) and a second user with a second PED, a voice of the first user in binaural sound to the second user by:
capturing, during the telephone call and with a first microphone located at a left ear of a dummy human head and a second microphone located at a right ear of the dummy human head, the voice of the first user in the binaural sound while the first user speaks to the dummy human head;
transmitting, during the telephone call and with a wireless transmitter located inside the dummy human head, the voice of the first user in the binaural sound captured with the first and second microphones to the first PED with the first user; and
transmitting, during the telephone call and with the first PED, the voice of the first user in the binaural sound received from the dummy human head over a wireless network and to the second PED with the second user.

2. The method of claim 1 further comprising:
deactivating, in response to a voice command issued when the telephone call commences, a microphone of the first PED so the voice of the first user is captured with the first and second microphones of the dummy human head instead of the microphone of the first PED.

3. The method of claim 1 further comprising:
providing the voice of the first user in the binaural sound to the second user that externally localizes at a sound localization point (SLP) that is a distance away from a head of the second user, wherein the distance of the SLP away from the head of the second user is equal to a distance between a head of the first user and the dummy human head during the telephone call.

4. The method of claim 1, wherein the dummy human head has a flat base that supports the dummy human head in an upright position, and the wireless transmitter is located inside the dummy human head and on a printed circuit board along with the first and second microphones.

5. The method of claim 1 further comprising:
sensing, with a sensor in the dummy human head, when a portable electronic device with headphones is removed from the dummy human head; and
activating, in response to sensing when the portable electronic device with the headphones is removed from the dummy human head, the dummy human head to enable capturing the voice of the first user for the telephone call and to activate transmitting the voice of the first user captured with the first and second microphones back to the first PED.

6. The method of claim 1 further comprising:
receiving, from the first PED and during the telephone call, a command to stop transmitting the voice of the first user as the binaural sound; and
switching, during the telephone call and in response to the command, the voice of the first user from being transmitted as binaural sound to being transmitted as one of stereo sound and mono sound.

7. The method of claim 1, further comprising:
displaying, with a display of the first PED and during the telephone call, an icon that indicates that the voice of the first user is being transmitted as the binaural sound to the second PED.

8. A non-transitory computer-readable storage medium that stores instructions that one or more electronic devices execute to provide binaural sound captured with a dummy head during a telephone call between a first user and a second user, the one or more electronic devices executing the instructions to execute a method comprising:
capturing, with two microphones separated from each other at left and right ears of the dummy head, a voice of the first user as the binaural sound during the telephone call between the first user and the second user while the first user is speaking to the dummy head;
transmitting, during the telephone call, the voice of the first user as the binaural sound captured with the two microphones from the dummy head to a portable electronic device with the first user while the first user speakers to the dummy head; and
transmitting, during the telephone call and over a wireless network, the voice of the first user as the binaural sound received from the dummy head from the portable electronic device of the first user to a portable electronic device with the second user.

9. The non-transitory computer-readable storage medium of claim 8 further comprising:
displaying, with a light emitting diode (LED) on the dummy head, a light that indicates that the voice of the first user is being transmitted as the binaural sound to the portable electronic device with the first user.

10. The non-transitory computer-readable storage medium of claim 8 further comprising:
receiving, from the first user, a command to capture the voice of the first user with the two microphones in the dummy head; and
disabling, during the telephone call and in response to receiving the command from the first user, a microphone in the portable electronic device with the first user so the portable electronic device with the second user receives the voice of the first user that was captured by the two microphones in the dummy head.

11. The non-transitory computer-readable storage medium of claim 8, wherein the dummy head has a size and shape of a human head, one of the two microphones is located in the left ear of the dummy head that has a shape of a human pinnae, and one of the two microphones is located in the right ear of the dummy head that has a shape of the human pinnae.

12. The non-transitory computer-readable storage medium of claim 8 further comprising:
executing, during the telephone call, an instruction from the first user to stop capturing the voice of the first user as the binaural sound with the dummy head and to start capturing and transmitting the voice of the first user as one of stereo sound or mono sound with a microphone located in the portable electronic device with the first user.

13. The non-transitory computer-readable storage medium of claim 8 further comprising:
detecting a distance between the dummy head and the portable electronic device with the first user; and
automatically switching the voice of the first user from being transmitted as the binaural sound to being transmitted as one of stereo or mono sound when the distance is a predetermined amount.

14. The non-transitory computer-readable storage medium of claim 8 further comprising:
displaying, before the telephone call commences, a visual indication on a display of the portable electronic device of the first user to indicate that the dummy head is capturing the binaural sound during the telephone call.

15. A method executed by one or more electronic devices that provide binaural sound during a telephone call between a first user and a second user, the method comprising:
receiving, at a wireless receiver in a portable electronic device of the first user during the telephone call and via a wireless transmission from a dummy human head that is proximate to the first user, a voice of the first user in binaural sound captured with microphones located in the ears of the dummy human head; and
transmitting, from a wireless transmitter in the portable electronic device of the first user during the telephone call, the voice of the first user in the binaural sound to a portable electronic device of the second user.

16. The method of claim 15 further comprising:
receiving, at the portable electronic device of the first user, an instruction to stop transmitting the voice of the first user in the binaural sound to the portable electronic device of the second user; and
activating, in response to receiving the instruction, a microphone in the portable electronic device of the first user so the voice of the first user transmits in one of stereo sound or mono sound to the portable electronic device of the second user during the telephone call between the first user and the second user.

17. The method of claim 15 further comprising:
displaying, with the portable electronic device of the first user, a visual indication that indicates to the first user that the dummy human head is capturing and transmitting the binaural sound during the telephone call.

18. The method of claim 15 further comprising:
detecting, with the portable electronic device of the first user, when the first user is no longer proximate to the dummy human head; and
switching, in response to detecting when the first user is no longer proximate to the dummy human head, the voice of the first user from being transmitted in the binaural sound to being transmitted in one of stereo sound or mono sound.

19. The method of claim 15 further comprising:
transmitting, from the portable electronic device of the first user and to the dummy human head, a command to stop capturing and transmitting the voice of the first user during the telephone call between the first user and the second user.

20. The method of claim 15, wherein the portable electronic device of the first user is a head mounted display worn on a head of the first user, and the ears of the dummy human head are shaped as human pinnae.

\* \* \* \* \*